March 17, 1959     R. A. DEIBEL ET AL     2,877,486
WINDSHIELD CLEANING SYSTEM
Filed Aug. 29, 1955
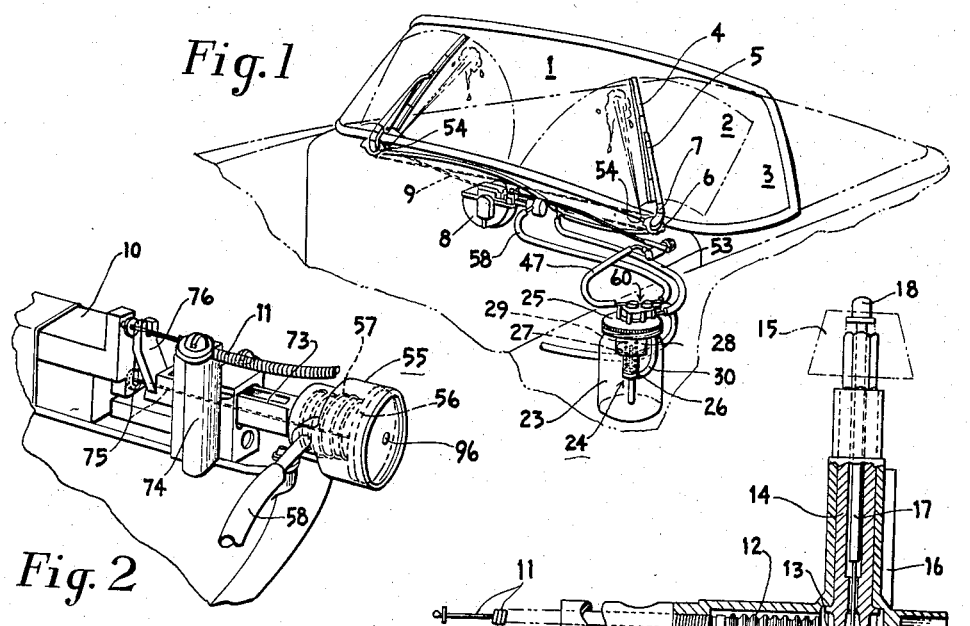
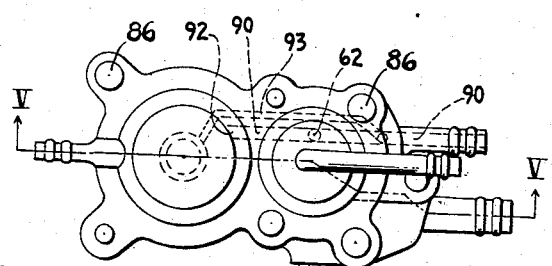
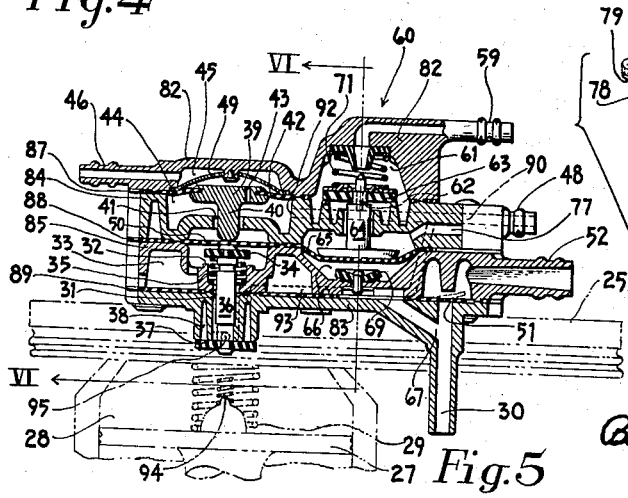
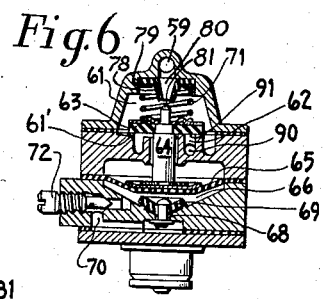
INVENTOR.
Raymond A. Deibel
BY and William C. Riester
ATTORNEYS.

United States Patent Office

2,877,486
Patented Mar. 17, 1959

2,877,486

WINDSHIELD CLEANING SYSTEM

Raymond A. Deibel, Cheektowaga, and William C. Riester, Eggertsville, N. Y., assignors to Trico Products Corporation, Buffalo, N. Y.

Application August 29, 1955, Serial No. 530,970

17 Claims. (Cl. 15—250.4)

This invention relates to the clearing of windshields by applying a liquid solvent to the surface to soften and dissolve congealed matter thereon, accompanied by a scrubbing and wiping action to remove the vision obscuring matter, the present disclosure being an improvement on those made in Patent No. 2,743,473 and copending application Serial No. 383,156 wherein a windshield washing mechanism is coordinated with the vehicle wiper mechanism to bring the latter into use to effect a joint operation through a chain of actions set in motion from a single control, thereby relieving the motorist from further and unnecessary effort on his part in maintaining a clear field of vision.

Windshield washers heretofore employed have embodied a suction operated motor for moving a pump plunger on its liquid intaking stroke and thereafter venting the suction motor to the atmosphere for releasing stored spring energy to drive the pump plunger on its liquid ejecting stroke. The suction motor of the earlier pump mechanism has been opened to the source of suction through remotely controlled valve means necessitating the use of plural hose connections up to the control on the instrument panel. Its coordinator is responsive to the negative pressure in the pump motor which pressure, if derived from the intake manifold, will fluctuate and render the coordinator uncertain. More recently this installation has been simplified through improved valve mechanism having an electromagnetic actuator for opening the source of suction to the washer motor, involving the use of electrical equipment. Its coordinator is responsive to the hydrostatic pressure developed in the spray line which pressure readily spends itself as the liquid discharges through the spray nozzles.

The primary object of the invention is to provide an improved washer-wiper system having a prolonged wiping cycle, following the application of a solvent to the windshield surface, which wiping cycle is made dependent upon the retention of the hydrostatic pressure in the system for a prescribed interval to arrest the wiper in a certain and definite manner.

A further object of the invention is to provide for compactness in the installation of the combined washer and wiper system, the actuating controls for the washer and the coordinator being built into a compact unit that is carried upon the washer reservoir while the coordinator motor is mounted on the wiper motor thereby affording a composite system comprising two major components which are easily installed, both being operable through a single control within the reach of the motorist.

A further object of the invention is to provide a wiper coordinating mechanism hydrostatically responsive and likewise hydrostatically controlled for holding over the wiper operation for a prescribed time interval after the spray has stopped. Again, the invention resides in means to preclude the wiper being turned off prematurely and thereby avoid a continued wetting of the windshield surface in the absence of a cooperating wiper to remove the moisture from the field of vision.

The foregoing and other objects will manifest themselves as this description progresses, reference being made therein to the accompanying drawing, wherein Fig. 1 is a fragmentary perspective view of a motor vehicle equipped with the combined windshield washing and wiping system of the present invention;

Fig. 2 is a fragmentary perspective view of the wiper motor showing the coordinating motor mounted thereon;

Fig. 3 is a longitudinal sectional view through the wiper and washer control within reach of the motorist, parts being left in elevation;

Fig. 4 is a top plan view of the pressure responsive actuator for the washer and the coordinator;

Fig. 5 is a vertical sectional view through the pressure responsive actuator, taken about on line V—V of Fig. 4;

Fig. 6 is a transverse sectional view through the pressure responsive actuator about on line VI—VI; and Fig. 7 is a fragmentary exploded view depicting the suction holding means for the coordinator.

Referring more particularly to the accompanying drawing, the windshield illustrated is of the panoramic type having a frontal portion 1 of comparatively slight curvature joined by corner portions 2 of relatively sharper curvature with lateral portions 3 to provide continuous surface contours of irregular curvature over which the wipers 4 may oscillate to maintain a broad field of vision both ahead and to the sides of the roadway.

The wiper system embodies an oscillatory arm for each wiper which arm has an outer section 5 rockably controlled by a contour cam 6 to rock the wiper for maintaining an attitude substantially normal to the surface being traversed. The inner end 7 of the arm is fixed to an oscillatory shaft which is driven by a pneumatic motor 8 through a suitable power transmission 9, such motor being of the suction operated type and having a control valve 10 designed to be adjusted through a Bowden cable 11, a rack 12 and pinion 13 upon turning the tubular shaft 14 with its hand knob 15. The shaft 14 is journaled in a journal support 16.

The washer system embodies a rod 17 which is slidably received by the shaft 14 and may be depressed by a button 18 to unseat a valve 19 against the urge of a spring 20 to admit atmospheric pressure from the spring chamber 21 to a nipple 22 for pump operation in applying a liquid solvent from a reservoir 23 to the windshield. The pump unit 24 is suspended from the cover 25 and has a plunger 26 which is lifted on its intake stroke by the piston 27 in a suction motor chamber 28 and returned on its delivery stroke by a spring 29, upon venting the vacuum motor to the atmosphere, to eject the liquid through conduits 30. A windshield washer pump of this general construction is more fully illustrated and described in Patent No. 2,746,652.

The motor of the pump unit is controlled by a pneumatic actuator having an atmospheric passage 31 opening over a seat 32 into an atmospheric chamber 33. A normally open valve 34 maintains the motor chamber 28 at atmospheric pressure and is designed to close upon the seat 32 against the urge of a spring 35 and at the same time to act through a spacer 36 in unseating a normally closed valve 37 to open a suction passage 38 to the motor chamber 28 to evacuate the same, the suction or negative pressure being obtained from a suitable source, such as provided by the intake manifold of the motor vehicle engine or by a source generating pump driven thereby. The opening and closing of the valves 34, 37 may be effectively executed by means of a plunger 39 having a stem 40 loosely guided in a wall opening 41 in axial alignment with the valve spacer 36. The plunger is herein shown as having a supporting diaphragm 42 and is formed with a small pressure equalizing port 43 of restricted size for normally equalizing the pressure in the two chambers 44 and 45 on opposite sides of the diaphragm. When the pressure is thus equalized, the valve spring 35 will function to lift the plunger 39, and when the chamber 45 is vented to the atmosphere by opening the valve 19, the pressure differential acting on the diaphragm will depress the plunger and with it the pump control valve unit 34, 36, 37 to break the suction hold on the valve 37 and to seat the atmospheric valve 34 for opening the upper portion of the pump motor chamber 28 to the negative pressure and initiating movement of the piston-plunger unit 27, 26 to intake a charge of the liquid solvent. For this purpose the upper chamber 45 is provided with a nipple 46 connected by a hose 47 to the nipple 22. The lower chamber 44 is in constant communication with a suction supply nipple 48, and therefore the conduit 47 will be normally evacuated by reason of the restricted pressure equalizing port 43 when the washer system control valve 19 is closed. However, when this control valve is unseated, the outside atmosphere will enter the upper chamber 45 faster than the port 43 can accommodate and create the actuating force to start the washer system in action. A filter screen 49 will serve to filter out foreign particles in the air flow from the venting valve. A flexible diaphragm 50 may be used to partition the suction chamber 44 from the atmospheric chamber 33 through which the depressive force is applied to the pump control 34, 36, 37. The liquid solvent is ejected from the pump 24, 26, through conduit 30 and in its upward course will flow past a flap type check valve 51 and out through a nipple 52 and hose connections 53 to the nozzles 54 by which the solvent is directed onto the windshield in the paths of the two wipers. The check valve 51 will serve to hold the liquid from draining out of the passages 52, 53 when the pump is idle.

A coordinating motor 55 is mounted on the wiper motor 8 and has a piston 56 backed by a spring 57 and connected to the control valve 10. This coordinating motor is connected by a hose 58 to a nipple 59 on the valve case 60, the nipple opening into a chamber 61 that is normally open to the atmosphere, as will appear hereinafter. A suction port 62 also opens into the chamber 61 but is normally closed off from the chamber by a valve 63. This valve is carried on a stem 64 which in turn is supported by a diaphragm 65 that partitions a hydrostatic pressure chamber 66 from the atmospheric chamber 61. A branch liquid passage 67 leads off from the conduit 30 and opens into the hydrostatic pressure chamber 66 through a port 68 that is normally closed by a check valve 69. Consequently, when the washer pump is energized, a portion of the liquid flow therefrom will enter the hydrostatic chamber 66 through the port 68, unseat the check valve 69 to build up a hydrostatic pressure therein for lifting upon the diaphragm 65 to open the valve 63 and thereby establish communication between the coordinating motor and the source of suction.

This brings into operation the windshield wiper system which is now maintained operative by the entrapped liquid within the hydrostatic chamber 66 to continue the wiping action for a period following the discontinuance of the solvent spray. This period of sole wiper action may be determined and regulated by providing a drain passage 70 for the release of the entrapped liquid from the pressurized chamber 66 under the urge of a spring 71 and throttling its escape by means of a set screw 72 to secure the desired prolongation of the sole wiper operation.

The coordinating motor 55 is supported by an arm 73 that is slidably received within a bearing 74 on the wiper motor. The arm 73 is formed with a bore through which the piston rod 75 slides, said rod having a positive or push-pull connection with the wiper control valve 10 in contrast to the push connection only between the manually operable cable 11 and the valve. This arrangement permits a coordinating action independently of and without affecting the manual setting of the cable 11. It also provides a mounting for the coordinating motor which permits the latter to bodily follow the valve 10 when the latter is manually adjusted. When the coordinator responds to the touch of the washer button 18, suction is applied through the conduit 58 to the piston 56 to retract it and thereby exert a push on the wiper motor valve 10 to bring the wiper into full speed operation. During this action the abutment or shoulder 76 on the arm 73 will react against the fixed bearing 74. After the prolonged period of sole wiper action, and following the discontinuance of the washer action, the coordinating motor will be vented to the atmosphere whereupon its spring 57 will exert a pull on the piston rod 75 to return the control 10 and park the wipers. This venting follows the seating of the valve 63 to close the suction port 62 and to open the chamber 61 to the atmosphere through ports 77 and 61' and thence along the loose fitting stem 64, following which the spring 57 will expend its stored up energy to withdraw the wiper control valve 10 to its off or parked position. The shoulder 76 may be extended laterally from the arm 73 to provide a supporting and guiding finger for the cable 11.

To preclude the coordinator from prematurely arresting the wiper during periods of low vacuum, such as with a wide open throttle in installations lacking a suction generating pump at which time the manifold vacuum momentarily drops, there is provided a vacuum sustaining valve for the coordinating motor in the form of an elastic sleeve 78 carried by a supporting washer 79 about its hole 80 for communicating with the nipple 59. This sleeve 78 acts as a check valve against the stem 64 to seal off air flow into the coordinating motor during extreme pressure fluctuations which might otherwise dissipate the vacuum and permit the spring 57 to arrest the wiping action while the washer sprays are yet active. Normally, the upper end 81 of the stem is withdrawn from the sleeve but may be tapered to insure its proper entry thereinto. As the valve is lifted from its seat by the hydrostatic pressure, the stem will enter the sleeve to effect the desired throttling of reverse air flow. The sleeve being elastic and distensible will readily permit air flow from the coordinator but not a reverse air flow.

The case of the valve assembly 60 is preferably molded in four sections and comprises a top section 82, a bottom section 83 and two interposed sections 84 and 85, and these four sections are clamped together by suitable fasteners 86 passing through registering apertures, the joints between the sections being sealed by sheets of packing material indicated at 87, 88 and 89. The sections 83 and 85 constitute a base portion while the sections 82 and 84 constitute a cap portion. The removal of the cap portion and its seal 88 gives access to the hydrostatic chamber and the valve unit 34, 36 and 37. The diaphragm 42 forms a part of the gasket forming sheet 87 between the casing sections 82 and 84; the partition or diaphragm 50 together with the diaphragm 65 form portions of the gasket sheet 88 between the casing sections 84 and 85; and the flap valve 51 is formed from the sealing gasket sheet 89 between the casing sections 83 and 85. This construction and arrangement facilitates the manufacture of the valve assembly and provides a structure which may be readily mounted on and attached to the cover 25 of the liquid containing reservoir. The top section 82 carries the nipples 46 and 59; the section 84 is formed with the nipple 48; and the section 85 is provided with the nipple 52. The suction supply passage 90 through the nipple 48 has three branches, one opening through the port 62 into the chamber 61 when the normally closed valve 63 is raised off its seat 91; a second one opens through port 92 into the lower chamber 44 for evacuating the venting passage 22, 46, 47 and suspending the hammer 39 in vacuum; and a third branch 93 which opens into the annular suction passage or port 38.

In operation, the washer system is brought into action simply by depressing the button 18 to unseat the valve 19 and vent the chamber 45 for unbalancing the normally vacuum suspended plunger 39 to cause the latter to bear upon the valve unit 34, 36, 37 with a force sufficient to unseat the suction valve 37 and seat the atmospheric valve 34. This chain of actions opens the pump motor to suction for lifting the piston 27, Fig. 5, against the urge of its motive spring 29 to bring the piston carried valve tripping element 94 up against the valve 37 to seat it after first breaking the suction hold on the atmospheric valve 34. This valving interrupts the suction communication and reestablishes the normal atmospheric communication to the pump motor chamber 28 through the atmospheric passage 31 and the lateral port 95 opening into the motor chamber. With the atmospheric pressure entering the motor chamber 28 the compressed motor spring 29 will act to depress the motor piston 27 and the pump plunger 26 as a unit on its liquid ejecting stroke to discharge the solvent out through passage 30 past the check valve 51, and to the nozzles 54, and simultaneously create a hydrostatic pressure in the chamber 66 to lift the valve 63 off its seat 91 for opening the suction port 62 to the coordinating motor 55, thereby bringing the wiper into action for a limited period of joint use with the spraying washer followed by a predetermined interval of sole wiper use to be determined by the release of the hydrostatic pressure from the chamber 66 as regulated by the throttling valve 72. The suction thus applied to the cordinating motor will retract its piston 56 against the urge of spring 57 and push on the piston rod 75 to move the control valve 10 to its full running position, a breather opening 96 facilitating the piston movement. Following the dissipation of the hydrostatic pressure from the chamber 66, the spring 57 will return the control valve to park the wipers.

The wiper system alone may be energized by turning the knob 15 to push on the wire 11 for sliding the control valve to its running position either for fast speed or an intermediate speed. During this movement of the valve the coordinating motor will idly follow, drifting bodily along in its bearing support 74 and carrying the shoulder 76 away therefrom. If the wiper is operating at an intermediate speed when the washer is turned on then the shoulder 76 will move back against the support before the control valve moves after which the control valve will be opened to its fast running position. The control valve remains in its full running position for the washing cycle and until the hydrostatic pressure in the trap chamber 66 dissipates whereupon the spring 57 will return the control valve 10 against the partially advanced end of the manually preset Bowden cable 11 and restore the wiper operation to its previously set intermediate speed.

When the source of suction is steady, such as when the intake manifold supplemented by an engine driven pump is used, the coordinating motor will remain constant in its action and hold the control valve 10 in its running position until the hydrostatic pressure is relieved. When the suction influence is fluctuating, as when the intake manifold alone is used, then should the manifold suction drop while the valve 63 and stem 64 are elevated, the sleeve 78 would close upon the cylindrical face of the stem to forestall the admission of air into the coordinating motor chamber and thereby sustain the coordinating motor operative until the hydrostatic pressure is relieved. While the hydrostatic pressure prevails the flanged bottom of the stem 64 may seat upwardly to further restrict the clearance about the stem and even seal completely the atmospheric opening 77 from the chamber 61. When the valve 63 is seated, atmospheric communication between passage 77 and the chamber 61 is obtained by a port-forming notch 61' in the annular seat concentric about the stem.

The entire washer system is wholly pneumatic in action and control except for the use of hydrostatic pressure to effect the coordinated operation of the windshield wiper. Since, therefore, this requires the action of the hydrostatic pressure, the wipers will not be turned on at all if there is no water in the reservoir. Consequently, the field of vision will not be obscured further by the wipers smearing any loose deposit on the glass. The compact arrangement simplifies and facilitates the installation of the coordinated wiper and washer systems in a practical manner.

The illustrated embodiment of the invention described discloses a combined windshield and washer system operated primarily by suction or negative pressure but obviously the invention is not confined to the suction actuation alone since the washer and wiper units could be operated by other fluid pressure, as well as electrically, in which latter instance the controls, instead of being valves, would be in the form of switches for opening and closing the electric circuits corresponding in principle to the fluid circuits in the illustrated embodiment. Therefore while the foregoing description has been given in detail, it is without thought of limitation since the inventive principles involved are capable of assuming other physical embodiments without departing from the spirit of the invention and the scope of the appended claims.

What is claimed is:

1. A windshield cleaning system comprising a wiper, a motor connected to operate the same, a control for starting and stopping the motor, a washer having a liquid pump with a given delivery cycle, a delivery nozzle receiving liquid under pressure from the pump, a coordinator responsive to the liquid pressure and connected to the control for starting the wiper motor, and regulated pressure holding means for prolonging the wiper action after the cycle and rendering the coordinator inoperative in response to dissipation of the liquid pressure.

2. A windshield cleaning system comprising a wiper unit having a motor and a control therefor, a powered actuator operatively connected to the control to move it for starting and stopping the wiper unit, a washer unit having a motor driven liquid pump and means for operating it for a predetermined time interval, a control connected to the actuator and responsive to the pump generated pressure to operate the actuator for starting the wiper unit, and regulatable pump-pressure-releasing time delay means acting on the actuator control to prolong the wiper operation after the time interval.

3. A fluid pressurized windshield cleaner comprising a wiper system including a wiper and a connected motor with a control valve, a washer system including a delivery nozzle and a connected pump with a normally closed control valve, a coordinating motor operatively connected to the first control valve and responsive to the delivery pressure of the pump for starting the wiper motor, and a pressure suspended actuator for the pump valve having a pressure equalizing passage and responsive to a pressure differential to open the second control valve, and a normally closed valve connected to the actuator and manually operable to unbalance the latter to start the pump.

4. A fluid pressurized windshield cleaner comprising a wiper system including a wiper and a connected motor with a control valve, a washer system including a delivery nozzle and a connected pump with a normally closed control valve, a coordinating motor operatively connected to the first control valve to start the wiper motor, a chamber, said pump supplying liquid pressure to said chamber, means operating in said chamber and responsive to the delivery pressure of the pump for energizing the coordinating motor to so start the wiper motor, and regulatable means for draining the liquid from the chamber and thereby relieving the pressure on the coordinating motor energizing means to enable stopping of the wiper motor.

5. A windshield cleaner comprising a wiper system including a wiping blade and a connected motor with a control valve, a washer system including a delivery nozzle and a connected pump with a normally closed control valve, a coordinating motor operatively connected to the wiper control valve and responsive to the delivery pressure of the pump for starting the wiper motor, a normally pressure balanced actuator for the pump valve responsive to a pressure differential, and a normally closed valve connected to the actuator and operable to unbalance it.

6. A windshield cleaner comprising a washer including a delivery nozzle and a connected pump with a spring biased normally closed control valve, a pressure-balanced pneumatic actuator separate from said control valve and operable to open the same upon unbalancing the actuator, and valve means for so unbalancing the actuator.

7. A windshield cleaner comprising a wiper system including a wiping blade and a connected motor with a control valve, a washer system including a delivery nozzle and a connected pump with a normally closed control valve, a coordinating motor operatively connected to the wiper control valve and responsive to the delivery pressure of the pump for starting the wiper motor, a normally pressure balanced actuator for the pump valve responsive to a pressure differential, a normally closed valve connected to the actuator and operable to unbalance it, said washer system having a delivery pressure chamber and said coordinating motor having a part connected to the first control valve for responding to the chamber pressure to so start the wiper.

8. A windshield cleaner comprising a wiper system including a wiping blade and a connected motor with a control valve, a washer system including a delivery nozzle and a connected pump with a normally closed control valve, a coordinating motor operatively connected to the wiper control valve with a valved inlet and a restricted drain for regulating the loss of liquid pressure therefrom after the washer pump stops, said washer system having a delivery pressure chamber, and means responsive to the chamber pressure for energizing the coordinating motor and for adjustably prolonging its operation after the pump stops.

9. A fluid pressurized windshield cleaner comprising a wiper system including a wiping blade and a connected motor with a control valve, a washer system including a delivery nozzle and a connected pump with a normally closed control valve, a hydrostatic pressure trap chamber pressurized by the pump and holding its effective pressure for a selectively variable time interval after the pump stops, a suction actuated coordinating motor operatively connected to the wiper control valve, and a normally closed valve responsive to the chamber pressure for connecting the coordinating motor to a source of suction to start the wiper motor.

10. A windshield cleaner comprising a wiper system including a wiping blade and a connected motor with a control, a washer system including a delivery nozzle and a pump with a control normally inoperative, said pump and nozzle being connected by a liquid conduit having a branch passage opening into a hydrostatic pressure chamber from which the liquid may drain back into the conduit through a restricted opening to delay the pressure dissipation, a pneumatic pressure responsive coordinating motor operatively connected to the wiper control, and means responsive to the delivery pressure of the chamber for actuating said coordinating motor to start the wiper motor, and an actuator for the pump control.

11. A windshield cleaner comprising a wiper system including a wiping blade and a connected motor with a control, a washer system including a delivery nozzle and a pump with a control normally inoperative, said pump and nozzle being connected by a liquid conduit having a branch passage opening into a hydrostatic pressure chamber from which the liquid may drain through a restricted opening, a pneumatic pressure responsive coordinating motor operatively connected to the wiper control for turning on the wiper motor, means including check valve means trapping the liquid under pressure in the chamber to hold the coordinating motor operative until the draining operation reduces the hydrostatic pressure a prescribed amount, means responsive to the chamber pressure for energizing the coordinating motor, and means operable to restore the wiper control to arrest the wiper following the drainage operation.

12. A windshield cleaner comprising a wiper system including a wiping blade and a connected motor with a control, a washer system including a delivery nozzle and a pump with a control normally inoperative, said pump and nozzle connected by a liquid conduit having a branch passage opening into a hydrostatic pressure chamber from which the liquid may drain through a restricted opening, a coordinating motor operatively connected to the wiper control responsive to the chamber pressure for energizing the coordinating motor, check valve means trapping the liquid under pressure in the chamber to hold the coordinating motor operative until the draining operation predeterminedly reduces the hydrostatic pressure, means operable to restore the wiper control to arrest the wiper following the drainage operation, and regulating means for varying the size of the restricted opening to adjust the operative period of the coordinating motor.

13. A windshield cleaner comprising a wiper system including a wiping blade and a connected motor with a control, a washer system including a delivery nozzle and a pump with a control normally inoperative, said pump and nozzle connected by a liquid conduit having a branch passage opening into a hydrostatic pressure chamber from which the liquid may drain through a restricted opening, a suction actuated coordinating motor operatively connected to the wiper control to render it operative, a control valve for the coordinating motor responsive to the chamber pressure to open the motor to a source of vacuum, and check valve means permitting air-withdrawal from the coordinating motor and closing against reverse airflow to sustain the latter during suction fluctuation.

14. A windshield cleaner comprising a wiper system including a wiping blade and a connected motor with a control, a washer system including a delivery nozzle and a pump with a control normally inoperative, said pump and nozzle being connected by a liquid conduit, a suction actuated coordinating motor operatively connected to the wiper control to render it operative, a control valve for the coordinating motor responsive to the conduit pressure to open the motor to a source of vacuum, and venting means including pin means operable by the last mentioned control valve and elastic sleeve means receiving said pin means for checking airflow into the coordinating motor while the hydrostatic pressure maintains in the conduit.

15. A windshield cleaning mechanism comprising a wiper system having a wiper and a motor for driving the same with a control for starting and stopping the motor, a washer system having a pump for intaking liquid from a reservoir and delivering it under pressure onto an associated windshield, a coordinator responsive to the liquid pressure and connected to the control for starting the wiper motor, and an actuator unit comprising a sectional body having a base portion and a cap portion superimposed thereon, said base portion having a pump control, and said cap portion having an actuator operable to actuate the pump control, with actuator control means accessible exteriorly of said actuator unit.

16. A windshield cleaning mechanism comprising a wiper system having a wiper and a motor for driving the same with a control for starting and stopping the motor, a washer system having a pump for intaking liquid from a reservoir and delivering it under pressure onto an associated windshield, a coordinator responsive to the liquid pressure and connected to the control for starting the wiper motor, and an actuator unit comprising a sectional body having a base portion and a cap portion superimposed thereon, said base portion having a pump delivery passage communicating with a hydrostatic pressure chamber, and said cap portion having a valve communicating with the coordinator and responsive to the hydrostatic pressure in the chamber for rendering the coordinator operative in response to the hydrostatic pressure in the pump delivery.

17. A windshield cleaner as set forth in claim 6, together with a normally open control valve connected to said normally closed valve, said actuator being operable to close said normally open valve upon opening said normally closed valve.

References Cited in the file of this patent

UNITED STATES PATENTS

| | | |
|---|---|---|
| 2,439,863 | Rappl | Apr. 20, 1948 |
| 2,743,473 | Oishei | May 1, 1956 |

FOREIGN PATENTS

| | | |
|---|---|---|
| 664,283 | Great Britain | Jan. 2, 1952 |

UNITED STATES PATENT OFFICE

CERTIFICATE OF CORRECTION

Patent No. 2,877,486                                    March 17, 1959

Raymond A. Deibel et al

It is hereby certified that error appears in the printed specification of the above numbered patent requiring correction and that the said Letters Patent should read as corrected below.

Column 7, line 38, beginning with "with a" strike out all to and including "pump stops" in line 40, and insert the same after "chamber" in line 41, same column.

Signed and sealed this 17th day of November 1959.

(SEAL)
Attest:

KARL H. AXLINE                                    ROBERT C. WATSON
Attesting Officer                                  Commissioner of Patents